(12) United States Patent
Gloeckner et al.

(10) Patent No.: US 7,199,166 B2
(45) Date of Patent: Apr. 3, 2007

(54) RADIATION-CURABLE RESINS BASED ON HYDROGENATED KETONE-ALDEHYDE AND PHENOL-ALDEHYDE RESINS AND A PROCESS FOR PREPARING THEM

(75) Inventors: Patrick Gloeckner, Ratingen (DE); Lutz Mindach, Marl (DE); Peter Denkinger, Nottuln (DE)

(73) Assignee: Degussa AG, Duesseldorf (DE)

( * ) Notice: Subject to any disclaimer, the term of this patent is extended or adjusted under 35 U.S.C. 154(b) by 35 days.

(21) Appl. No.: 10/919,292

(22) Filed: Aug. 17, 2004

(65) Prior Publication Data

US 2005/0124716 A1 Jun. 9, 2005

(30) Foreign Application Priority Data

Aug. 22, 2003 (DE) .................. 103 38 560

(51) Int. Cl.
*C08L 61/02* (2006.01)
*C08F 283/00* (2006.01)
*C08F 283/06* (2006.01)

(52) U.S. Cl. .................. 522/94; 522/166; 522/109; 525/153; 525/401

(58) Field of Classification Search .................. 522/90, 522/166, 94, 109; 525/153, 401
See application file for complete search history.

(56) References Cited

U.S. PATENT DOCUMENTS

| | | | |
|---|---|---|---|
| 3,759,809 A * | 9/1973 | Carlick et al. ................ 522/97 |
| 4,070,500 A | 1/1978 | Leitner et al. |
| 4,205,018 A | 5/1980 | Nagasawa et al. |
| 4,295,947 A * | 10/1981 | Ohtani et al. ................ 522/103 |
| 4,542,194 A | 9/1985 | Doerffel et al. |
| 4,804,721 A * | 2/1989 | Zupancic et al. ........... 525/502 |
| 4,815,498 A * | 3/1989 | Gryson et al. ............. 139/351 |
| 5,114,741 A * | 5/1992 | Zupancic et al. ........... 427/552 |
| 5,185,201 A * | 2/1993 | Wendt ........................ 442/401 |
| 5,554,712 A * | 9/1996 | Huynh-Tran et al. ......... 528/58 |
| 5,705,599 A * | 1/1998 | Felixberger et al. ........ 528/227 |
| 5,739,214 A | 4/1998 | Schunck |
| 5,919,859 A * | 7/1999 | Ortelt et al. ................ 524/591 |
| 5,962,582 A * | 10/1999 | Lange ........................ 524/592 |
| 6,096,797 A | 8/2000 | Prantl et al. |
| 2005/0043501 A1* | 2/2005 | Glockner et al. ........... 528/222 |
| 2005/0148686 A1* | 7/2005 | Eugene et al. ............. 523/160 |

FOREIGN PATENT DOCUMENTS

| | | |
|---|---|---|
| DE | 870 022 | 3/1953 |
| DE | 2 345 624 | 4/1974 |
| DE | 24 38 724 | 8/1974 |
| DE | 24 38 712 | 2/1976 |
| DE | 240 318 | 10/1986 |
| EP | 0 111 686 | 6/1984 |

* cited by examiner

*Primary Examiner*—Susan Berman
(74) *Attorney, Agent, or Firm*—Oblon, Spivak, McClelland, Maier & Neustadt, P.C.

(57) ABSTRACT

Radiation-curable resins containing a carbonyl-hydrogenated ketone-aldehyde and/or a ring-hydrogenated phenyl-aldehyde resins, and a process for preparing them.

70 Claims, No Drawings

RADIATION-CURABLE RESINS BASED ON HYDROGENATED KETONE-ALDEHYDE AND PHENOL-ALDEHYDE RESINS AND A PROCESS FOR PREPARING THEM

BACKGROUND OF THE INVENTION

1. Field of the Invention

The invention relates to radiation-curable resins based on carbonyl-hydrogenated ketone-aldehyde and ring-hydrogenated phenyl-aldehyde resins, to a process for preparing them and to compositions thereof.

2. Description of the Related Art

Radiation-curable coating materials have become increasingly important in recent years, owing at least in part to the low VOC (volatile organic compounds) content of these materials.

The film-forming components in the coating material are of relatively low molecular mass and hence of low viscosity thereby eliminating the need for high fractions of organic solvents. Following application of the coating material to a substrate, durable coatings are obtained by the formation of a high molecular mass, polymeric network through crosslinking reactions initiated, for example, by UV light.

Ketone-aldehyde resins are used in coating materials, for example, as additive resins in order to enhance certain properties such as initial drying rate, gloss, hardness or scratch resistance. Owing to their relatively low molecular weight, conventional ketone-aldehyde resins possess a low melt viscosity and low solution viscosity and therefore also serve as film-forming functional fillers in coating materials.

Ketone-aldehyde resins normally possess hydroxyl groups and can therefore be crosslinked only with, for example, polyisocyanates or amine resins. These crosslinking reactions are usually initiated and/or accelerated thermally.

Ketone-aldehyde resins are not suitable for radiation-initiated crosslinking reactions which proceed by with cationic and/or free-radical reaction mechanisms.

Accordingly, ketone-aldehyde resins are normally added to radiation-curable coating systems as, for example, a film-forming component, but not as a crosslinking component. Owing to the uncrosslinked fractions, the resistance of such coatings to gasoline, chemicals or solvents, for example, is often low.

DE 23 45 624, U.S. Pat. No. 5,739,214, U.S. Pat. No. 4,205,018, DD 24 0318, DE 24 38 724, and JP 09143396 describe the use of ketone-aldehyde resins and ketone resins, e.g., cyclohexanone-formaldehyde resins, in radiation-curable systems. Radiation-induced crosslinking reactions of these resins are not described.

U.S. Pat. No. 6,096,797 describes the use of nonradiation-curable resins formed from urea (derivatives), ketone or aldehydes as an added component in a mixture with radiation-curable resins.

DE 24 38 712 describes radiation-curing printing inks composed of film-forming resins, ketone resins and ketone-formaldehyde resins, and polymerizable components such as polyfunctional acrylate esters of polyhydric alcohols. To the skilled worker it is obvious that a radiation-induced crosslinking reaction of the modified ketone-aldehyde resins and ketone resins can only come about through the use of unsaturated fatty acids. It is known, however, that resins having a high oil content tend toward unwanted yellowing.

U.S. Pat. No. 4,070,500 describes the use of nonradiation-curable ketone-formaldehyde resins as a film forming component in radiation-curable inks.

The conversion of carbonyl groups into secondary alcohols by hydrogenation of ketone-aldehyde resins has long been practiced (DE-C 8 70 022). A typical and known product is Kunstharz SK [synthetic resin SK] from Degussa AG. Likewise known are resins based on phenolic resin, whose aromatic units have been converted into cycloaliphatic groups by hydrogenation, with some of the hydroxyl groups retained. The use of carbonyl-hydrogenated and ring-hydrogenated ketone-aldehyde resins based on ketones containing aromatic groups is a further possibility. A resin of this kind is described in U.S. Pat. No. 4,542,194. The OH number of said products, at more than 200 mg KOH/g, is very high.

SUMMARY OF THE INVENTION

Accordingly, it is an object of the present invention to modify carbonyl-hydrogenated ketone-aldehyde resins and/or ring-hydrogenated phenyl-aldehyde resins chemically to give radiation-curable resins which are stable to hydrolysis, are chemically and mechanically resistant, and possess a high yellowing resistance.

Surprisingly it has been possible to achieve this object by providing carbonyl-hydrogenated ketone-aldehyde resins and/or ring-hydrogenated phenolic resins in a polymer analogous fashion with ethylenically unsaturated moieties.

It is described herein that carbonyl-hydrogenated ketone-aldehyde resins and/or ring-hydrogenated phenyl-aldehyde resins which possess ethylenically unsaturated moieties, in the presence of suitable compounds such as, for example, photoinitiators, and in the presence if desired of suitable photosensitizers, can, by induction with, for example, UV light, be converted into a polymeric network which depending on the fraction of ethylenically unsaturated groups, possesses chemical and mechanical resistance and hardness which is high to very high.

DETAILED DESCRIPTION OF THE INVENTION

The invention provides radiation-curable resins containing

A) at least one carbonyl-hydrogenated ketone-aldehyde resin and/or

B) at least one ring-hydrogenated phenyl-aldehyde resin, and

C) at least one compound having at least one ethylenically unsaturated moiety and at the same time at least one moiety which is reactive toward A) and/or B).

In embodiments, the invention compositions may comprise the above-mentioned components together with any number of additional components such as, for example, fillers, optical brightness, or any other component used in coating applications. The invention compositions may also contain only additional components that do not significantly affect the properties of any resulting coating or film. The properties that remain unaffected include chemical resistance, mechanical resistance and/or thermal resistance. In one embodiment the invention compositions contain only components A and/or B, and C optionally in an inert medium suspension or solution.

The invention also provides radiation-curable resins obtained by polymer analogous reaction of
A) at least one carbonyl-hydrogenated ketone-aldehyde resin and/or
B) at least one ring-hydrogenated phenyl-aldehyde resin, and
C) at least one compound comprising at least one ethylenically unsaturated moiety and at the same time at least one moiety which is reactive toward A) and B).

Suitable ketones for preparing the carbonyl-hydrogenated ketone-aldehyde resins (component A) include all ketones, especially acetone, acetophenone, methyl ethyl ketone, heptan-2 one, pentan-3 one, methyl isobutyl ketone, cyclopentanone, cyclododecanone, mixtures of 2,2,4 and 2,4,4 trimethylcyclopentanone, cycloheptanone and cyclooctanone, cyclohexanone and all alkyl-substituted cyclohexanones having one or more alkyl radicals containing in total 1 to 8 carbon atoms, individually or in a mixture. Examples that may be mentioned of alkyl substituted cyclohexanones include 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone.

In general, however, any ketone known in the literature to be suitable for ketone resin syntheses, more generally all C—H acidic ketones, can be used. Preference is given to carbonyl-hydrogenated ketone-aldehyde resins based on the acetophenone, cyclohexanone, 4-tert-butylcyclohexanone, 3,3,5-trimethylcyclohexanone, and heptanone, alone or in a mixture.

Suitable aldehyde components of the carbonyl-hydrogenated ketone-aldehyde resins (component A) include for example linear or branched aldehydes, such as formaldehyde, acetaldehyde, n-butyraldehyde and/or isobutyraldehyde, valeraldehyde, and dodecanal. In general it is possible to use any aldehydes known in the literature to be suitable for ketone-aldehyde resin syntheses. It is preferred, however, to use formaldehyde, alone or in mixtures with other aldehydes.

The formaldehyde is normally used in the form of an aqueous or alcoholic (e.g., methanol or butanol) solution with a strength of from about 20 to 40% by weight. Other forms of formaldehyde, such as para-formaldehyde or trioxane, for example, are likewise possible. Aromatic aldehydes, such as benzaldehyde, can likewise be present as a mixture with formaldehyde.

Particularly preferred starting compounds used for component A) are carbonyl-hydrogenated resins of acetophenone, cyclohexanone, 4-tert-butylcyclohexanone, 3,3,5 trimethylcyclohexanone, and heptanone, alone or as a mixture, and formaldehyde.

The resins of ketone and aldehyde are hydrogenated with hydrogen in the presence of a catalyst at pressures of up to 300 bar. In the course of the hydrogenation the carbonyl group of the ketone-aldehyde resin is converted into a secondary hydroxyl group. Depending on reaction conditions, some of the hydroxyl groups may be eliminated, resulting in methylene groups. This is illustrated in the following scheme:

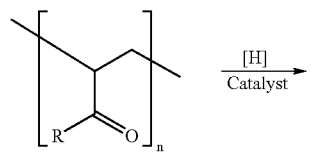

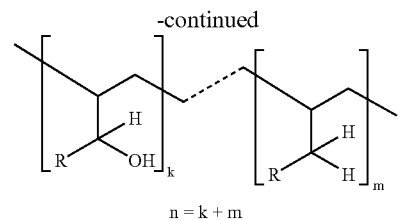

$n = k + m$

Component B) may include ring-hydrogenated phenyl-aldehyde resins of the novolak type derived from aldehydes such as formaldehyde, butyraldehyde or benzaldehyde, preferably formaldehyde. To a minor extent it is possible to use nonhydrogenated novolaks, but these may then have lower light fastnesses.

Particularly suitable are ring-hydrogenated resins based on alkyl-substituted phenyls. In general it is possible to use any phenyls in the literature known to be suitable for phenolic resin syntheses.

Examples of suitable phenyls that may be mentioned include phenyl, 2- and 4-tert-butylphenyl, 4-amylphenyl, nonylphenyl, 2- and 4-tert-octylphenyl, dodecylphenyl, cresol, xylenols, and bisphenyls, alone or as a mixture.

It is particularly preferred to use ring-hydrogenated, alkyl-substituted phenyl-formaldehyde resins of the novolak type. Preferred phenolic resins are reaction products of formaldehyde and 2- and 4-tert-butylphenyl, 4-amylphenyl, nonylphenyl, 2- and 4-tert-octylphenyl, and dodecylphenyl.

The novolaks are hydrogenated with hydrogen in the presence of a suitable catalyst. Through the choice of the catalyst the aromatic ring is converted into a cycloaliphatic ring. Through a suitable choice of reaction conditions the hydroxyl group is retained.

This is illustrated by the following scheme:

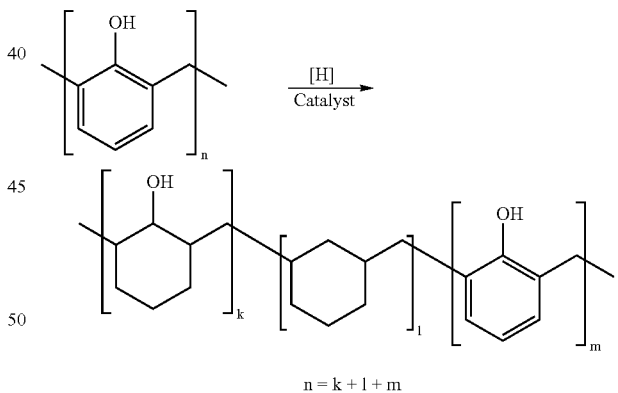

$n = k + l + m$

Under some hydrogenation conditions it is also possible for the hydroxyl groups to be hydrogenated, thereby giving rise to cycloaliphatic rings. The ring-hydrogenated resins possess OH numbers of from 50 to 450 mg KOH/g, preferably from 100 to 350 mg KOH/g, more preferably from 150 to 300 mg KOH/g. The fraction of aromatic groups is below 50% by weight, preferably below 30% by weight, more preferably below 10% by weight.

The radiation-curable resins on which the invention is based are obtained by a polymer analogous reaction of the carbonyl-hydrogenated ketone-aldehyde resins and/or of the ring-hydrogenated phenolic resins, in the melt or in a suitable solvent solution, with component C). Component C) may be, for example, maleic anhydride, (meth)acrylic acid derivatives such as (meth)acryloyl chloride, glycidyl (meth)acrylate, (meth)acrylic acid and/or the low molecular mass alkyl esters and/or anhydrides thereof, alone or as a mixture. It is also possible to obtain radiation-curable resins by reacting the carbonyl-hydrogenated ketone-aldehyde resins and/or ring-hydrogenated phenolic resins with isocyanates possessing an ethylenically unsaturated moiety, such as (meth)acryloyl isocyanate, α,α-dimethyl-3-isopropylbenzyl isocyanate, (meth)acrylalkyl isocyanate with alkyl spacers possessing from 1 to 12, preferably from 2 to 8, more preferably from 2 to 6 carbon atoms, such as methacrylethyl isocyanate and methacrylbutyl isocyanate, for example. Further reaction products which have proven suitable are those of hydroxyalkyl (meth)acrylates whose alkyl spacers have from 1 to 12, preferably from 2 to 8, more preferably from 2 to 6 carbon atoms and diisocyanates such as, for example, cyclohexyl diisocyanate, methylcyclohexyl diisocyanate, ethylcyclohexyl diisocyanate, propylcyclohexyl diisocyanate, methyldiethylcyclohexyl diisocyanate, phenylene diisocyanate, tolylene diisocyanate, bis(isocyanatophenyl)methane, propane diisocyanate, butane diisocyanate, pentane diisocyanate, hexane diisocyanate, such as hexamethylene diisocyanate (HDI) or 1,5-diisocyanato-2-methylpentane (MPDI), heptane diisocyanate, octane diisocyanate, nonane diisocyanate, such as 1,6-diisocyanato-2,4,4-trimethylhexane or 1,6-diisocyanato-2,2,4-trimethylhexane (TMDI), nonane triisocyanate, such as 4-isocyanatomethyloctane 1,8-diisocyanate (TIN), decane di- and triisocyanate, undecane di- and triisocyanate, dodecane di- and triisocyanates, isophorone diisocyanate (IPDI), bis(isocyanatomethylcyclohexyl)methane ($H_{12}$MDI), isocyanatomethylmethylcyclohexyl isocyanate, 2,5(2,6)-bis(isocyanatomethyl)bicycle [2.2.1]heptane (NBDI), 1,3-bis(isocyanatomethyl) cyclohexane (1,3-$H_6$-XDI) or 1,4 bis(isocyanatomethyl) cyclohexane (1,4-$H_6$-XDI), alone or in a mixture. Examples that may be mentioned include the reaction products in a 1:1 molar ratio of hydroxyethyl acrylate and/or hydroxyethyl methacrylate with isophorone diisocyanate and/or $H_{12}$MDI and/or HDI.

Another preferred class of polyisocyanates are compounds having more than two isocyanate groups per molecule and which may be prepared by trimerizing, allophanatizing, biuretizing and/or urethanizing the simple diisocyanates. Examples include the reaction products of these simple diisocyanates, such as IPDI, HDI and/or HMDI, for example, with polyhydric alcohols (e.g., glycerol, trimethylolpropane, pentaerythritol) and/or polyfunctional polyamines or else the triisocyanurates obtainable by trimerizing the simple diisocyanates, such as IPDI, HDI, and HMDI, for example.

If desired it is possible to use a suitable catalyst for preparing the resins of the invention. Suitable compounds are those known in the literature which accelerate an OH—NCO reaction, such as, for example, diazabicyclooctane (DABCO) or dibutyltin dilaurate (DBTL), for example.

The functionality of the resins ranges from low to high in accordance with the ratio of the reactants to one another. Through the choice of reactants it is also possible to set the subsequent hardness of the crosslinked film. If, for example, a hard resin such as hydrogenated acetophenone-formaldehyde resin is reacted with α,α-dimethyl-3-isopropylbenzyl isocyanate, the resulting products are harder than those obtained through the reaction of (meth)acrylethyl isocyanate and/or hydroxyethyl acrylate-isophorone diisocyanate adducts; the flexibility, however, is lower. It has also been found that the reactivity of ethylenically unsaturated compounds with little steric hindrance—such as of hydroxyethyl acrylate, for example—is higher than in the case of those which are sterically hindered, such as α,α-dimethyl-3-isopropenylbenzyl isocyanate, for example.

It is also possible to replace some of the carbonyl-hydrogenated ketone-aldehyde resins A) and/or ring-hydrogenated phenyl-aldehyde resins B) by further hydroxy-functional polymers such as, for example, hydroxy-functional polyethers, polyesters and/or polyacrylates. In this case, mixtures of these polymers with components A) and/or B) can be reacted with component C) directly. It has been found that it is also possible to prepare adducts of A) and/or B) with, for example, hydroxy-functional polyethers, polyesters and/or polyacrylates, using the above-mentioned diisocyanates and/or triisocyanates, and only then reacting these adducts with component C). In contrast to the "plain" carbonyl-hydrogenated ketone-aldehyde resins A) and/or ring-hydrogenated phenyl-aldehyole resin B) it is thereby possible to adjust improved flexibility and hardness of the resins, for example. The further hydroxy-functional polymers generally possess molecular weights Mn of between 200 and 10,000 g/mol, preferably between 300 and 5,000 g/mol.

The invention also provides a process for preparing radiation-curable resins by polymer analogous reaction of:
A) carbonyl-hydrogenated ketone-aldehyde resins, and/or
B) ring-hydrogenated phenyl-aldehyde resins with
C) compounds which contain at least one ethylenically unsaturated moiety and at least one moiety which is reactive toward A) and B), optionally in the presence of further hydroxy-functionalized polymers.

In one embodiment the invention resin compositions are prepared in the melt or in a suitable, organic solvent solution of the carbonyl-hydrogenated ketone-aldehyde resin and/or ring-hydrogenated phenyl-aldehyde resin.

For this purpose, in one preferred embodiment, the compound which contains at least one ethylenically unsaturated moiety and the moiety which is reactive toward A) and B), is added to a solution or melt of the carbonyl-hydrogenated ketone-aldehyde resin A) and/or ring-hydrogenated phenyl-aldehyde resin B), in the presence, if desired, of a suitable catalyst.

The temperature of the reaction is selected in accordance with the reactivity of component C). Where isocyanates are used as component C), suitable temperatures have been found to be between 30 and 150° C., preferably between 50 and 140° C.

The optional solvent may be separated off, if desired, after the end of the reaction, in which case a powder of the product of the invention is then generally obtained.

It has proven advantageous to react 1 mol of the carbonyl-hydrogenated ketone-aldehyde resin and/or ring-hydrogenated-phenylaldehyde resin—based on the number average molecular weight ($M_n$)—with from 0.5 to 15 mol, preferably from 1 to 10 mol, in particular from 2 to 8 mol of the unsaturated compound (component C).

In another preferred embodiment the compound which contains at least one ethylenically unsaturated moiety and optionally at least one moiety which is reactive toward A) and B) and the additional polymer, optionally in the presence of a suitable catalyst, is added to the solution or melt of the carbonyl-hydrogenated ketone-aldehyde resin A) and/or ring-hydrogenated phenyl-aldehyde resin B) and the hydroxy-functional polymer, such as polyether, polyester and/or polyacrylate, for example.

The temperature of the reaction is selected in accordance with the reactivity of component C). Where isocyanates are used as component C), suitable temperatures have been found to be between 30 and 150° C., preferably between 50 and 140° C.

The solvent that may be present can be separated off if desired after the end of the reaction, in which case a powder of the product of the invention is then generally obtained.

It has proven advantageous to react 1 mol of component A) and/or component B) and/or additional polymers—based on $M_n$—with from 0.5 to 15 mol, preferably from 1 to 10 mol, in particular from 2 to 8 mol of the unsaturated compound (component C).

In another preferred embodiment a di- and/or trifunctional isocyanate is added to the solution or melt of the carbonyl-hydrogenated ketone-aldehyde resin A) and/or ring-hydrogenated phenyl-aldehyde resin B) and the hydroxy-functional polymer, such as polyether, polyester and/or polyacrylate, for example, and a hydroxy-functional preadduct is prepared. Only then is the compound which contains at least one ethylenically unsaturated moiety and at the same time at least one moiety which is reactive toward A) and B) and the additional polymer, in the presence if desired of a suitable catalyst, added.

The temperature of the reaction is selected in accordance with the reactivity of component C). Where isocyanates are used as component C), suitable temperatures have been found to be between 30 and 150° C., preferably between 50 and 140° C.

The optional solvent may be separated off if desired after the end of the reaction, in which case a powder of the product of the invention is then generally obtained.

It has proven advantageous to react 1 mol of component A) and/or component B) and/or additional polymers—based on $M_n$—with from 0.5 to 15 mol, preferably from 1 to 10 mol, in particular from 2 to 8 mol of the unsaturated compound (component C).

In the presence of suitable photoinitiators, and in the presence if desired of suitable photosensitizers, these resins can be converted by irradiation into polymeric, insoluble networks which, depending on the level of ethylenically unsaturated groups present, may produce elastomers to thermosets.

The examples which follow are intended to illustrate the invention but not to restrict its scope of application:

EXAMPLE 1

Synthesis was carried out by reacting of 1 mol of Kunstharz SK (Degussa AG; hydrogenated acetophenone-formaldehyde resin, OHN=240 mg KOH/g (acetic anhydride method), Mn ~1000 g/mol) with 1.5 mol of a reaction product of IPDI and hydroxyethyl acrylate in a ratio of 1:1 in the presence of 0.2% (on resin) of 2,6 bis(tert-butyl)-4-methylphenyl (Ralox BHT, Degussa AG) and 0.1% (on resin) of dibutyltin dilaurate, 65% strength in methoxypropyl acetate, at 80° C. under nitrogen in a three-necked flask with stirrer, reflux condenser, and temperature sensor until an NCO number of less than 0.1 was reached. The pale, clear solution obtained possessed a dynamic viscosity of 51.56 Pa·s.

EXAMPLE 2

The reaction was carried out of 1 mol of Kunstharz SK (Degussa AG; OHN=240 mg KOH/g (acetic anhydride method), Mn ~1000 g/mol) and 4 mol of a reaction product of IPDI and hydroxyethyl acrylate in a ratio of 1:1 in the presence of 0.2% (on resin) of 2,6-bis(tert-butyl)-4-methylphenol (Degussa AG) and 0.1% (on resin) of dibutyltin dilaurate, 65% strength in methoxypropyl acetate, at 80° C. under nitrogen in a three-necked flask with stirrer, reflux condenser, and temperature sensor until an NCO number of less than 0.1 was reached. The pale, clear solution obtained possessed a dynamic viscosity of 26.2 Pa·s.

The resin solutions from examples 1 and 2 were admixed with Darocur 1173 (Ciba Specialty Chemicals, 1.5% based on resin solids) and applied to a glass plate and the solvent was evaporated at elevated temperature (30 min, 80° C.). The films were then cured by means of UV light (medium-pressure mercury lamp, 70 W/optical filter 350 µm) for about 12 seconds. The films, previously soluble, are no longer soluble in methyl ethyl ketone.

German application 10338560.6 filed on Aug. 22, 2003 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A resin composition for preparing a radiation curable resin, comprising:
    (a) at least one base resin selected from the group consisting of a carbonyl-hydrogenated ketone-aldehyde resin and a ring-hydrogenated phenol-aldehyde resin and
    (b) (meth)acrylic acid and/or a derivative thereof containing a functional group reactive with the base resin.

2. The composition as claimed in claim 1, further comprising at least one additional hydroxyl-functionalized polymer.

3. The composition as claimed in claim 2, wherein the additional hydroxyl-functionalized polymer is at least one polymer selected from the group consisting of a polyether, a polyester and a polyacrylate.

4. The composition as claimed in claim 1, wherein the ketone in the carbonyl-hydrogenated ketone-aldehyde resin is at least one C—H acidic ketone.

5. The composition as claimed in claim 1, wherein the ketone in the carbonyl-hydrogenated ketone-aldehyde resin is at least one ketone selected from the group consisting of acetone, acetophenone, methyl ethyl ketone, heptan-2-one, pentan-3-one, methyl isobutyl ketone, cyclopentanone, cyclododecanone, a mixture of 2,2,4- and 2,4,4-trimethylcyclopentanone, cycloheptanone, cyclooctanone, and cyclohexanone.

6. The composition as claimed in claim 1, wherein the ketone in the carbonyl-hydrogenated ketone-aldehyde resin is at least one alkyl-substituted cyclohexanone having one or more alkyl radicals containing in total 1 to 8 carbon atoms.

7. The composition as claimed in claim 6, wherein the at least one alkyl-substituted cyclohexanone is selected from the group consisting of 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone.

8. The composition as claimed in claim 1, wherein the ketone in the carbonyl-hydrogenated ketone-aldehyde resin is at least one alkyl-substituted cyclohexanone selected from the group consisting of cyclohexanone, 4-tert-butylcyclohexanone, 3,3,5-trimethylcyclohexanone, and heptanone.

9. The composition as claimed in claim 1, wherein the aldehyde in the base resin is at least one aldehyde selected from the group consisting of formaldehyde, acetaldehyde, n-butyraldehyde, isobutyraldehyde, valeraldehyde, and dodecanal.

10. The composition as claimed in claim 9, wherein the aldehyde in the base resin is at least one aldehyde selected from the group consisting of formaldehyde, paraformaldehyde and trioxane.

11. The composition as claimed in claim 1, wherein the base resin is at least one hydrogenation product of a resin comprising reacted units of formaldehyde and at least one ketone selected from the group consisting of acetophenone, cyclohexanone, 4-tert-butylcyclohexanone, 3,3,5-trimethylcyclohexanone, and heptanone.

12. The composition as claimed in claim 1, wherein the ring-hydrogenated phenol-aldehyde resin is a hydrogenated phenol-aldehyde resin comprising at least one of formaldehyde, butyraldehyde or benzaldehyde.

13. The composition as claimed in claim 1, further comprising a minor amount of one or more nonhydrogenated phenol-aldehyde resins.

14. The composition as claimed in claim 1, wherein the ring-hydrogenated phenol-aldehyde resin is one or more ring-hydrogenated resins comprising one or more alkyl-substituted phenols.

15. The composition as claimed in claim 14, wherein the alkyl-substituted phenol is at least one phenol selected from the group consisting of 4-tert-butylphenol, 4-amylphenol, nonylphenol, tert-octylphenol, dodecylphenol, cresol, xylenol, and bisphenol.

16. The composition as claimed in claim 1, wherein said (meth)acrylic acid and/or a derivative thereof containing a functional group reactive with the base resin is at least one of (meth)acryloyl chloride, glycidyl (meth)acrylate, (meth) acrylic acid, a low molecular mass alkyl ester of (meth) acrylic acid or an anhydride of (meth)acrylic acid.

17. The composition as claimed in claim 1, wherein said said (meth)acrylic acid derivative is at least one isocyanate selected from the group consisting of (meth)acryloyl isocyanate and (meth)acrylalkyl isocyanate wherein the alkyl group contains 1 to 12 carbon atoms.

18. The composition as claimed in claim 1, wherein said (meth)acrylic acid derivative is a reaction product of (a) a hydroxyalkyl (meth)acrylate wherein the alkyl group contains 1 to 12 carbon atoms with (b) one or more diisocyanates.

19. The composition as claimed in claim 18, wherein the alkyl group contains from 2 to 8 carbon atoms.

20. The composition as claimed in claim 18, wherein the alkyl group contains from 2 to 6 carbon atoms.

21. The composition as claimed in claim 18, wherein said (meth)acrylic acid derivative is at least one of methacrylethyl isocyanate or methacrylbutyl isocyanate.

22. The composition as claimed in claim 18, wherein the diisocyanates are selected from the group consisting of cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate, bis(isocyanatophenyl) methane, propane diisocyanate, butane diisocyanate, pentane diisocyanate, hexamethylene diisocyanate (HDI), 1,5-diisocyanato-2-methylpentane (MPDI), heptane diisocyanate, octane diisocyanate, 1,6-diisocyanato-2,4,4-trimethylhexane, 1,6-diisocyanato-2,2,4-trimethylhexane (TMDI), 4-isocyanatomethyloctane 1,8-diisocyanate (TIN), decane diisocyanate, decane triisocyanate, undecane diisocyanate, undecane triisocyanate, dodecane diisocyanate, dodecane triisocyanate, isophorone diisocyanate, bis(isocyanatomethylcyclohexyl)methane, isocyanatomethylmethylcyclohexyl isocyanate, 2,5 (2,6)-bis(isocyanatomethyl) bicycle[2,2.1]heptane, 1,3-bis(isocyanatomethyl)cyclohexane, and 1,4-bis(isocyanatomethyl)cyclohexane.

23. The composition as claimed in claim 22, further comprising one or more polyisocyanates prepared by at least one of trimerizing, allophanatizing, biuretizing or urethanizing one or more simple diisocyanates.

24. The composition as claimed in claim 1, wherein (meth)acrylic acid derivative is a reaction product of a 1:1 molar ratio of hydroxyethyl acrylate or hydroxyethyl methacrylate with at least one of isophorone diisocyanate bis (isocyanatomethyl)cyclohexane ($H_{12}$MDI), or hexamethylene diisocyanate (HDI).

25. The composition as claimed in claim 1, wherein 1 mol, based on $M_n$, of the at least one of the carbonyl-hydrogenated ketone-aldehyde resin or the ring-hydrogenated phenol-aldehyde resin and from 0.5 to 15 mol of said (meth) acrylic acid and/or a derivative thereof containing a functional group reactive with the base resin are present.

26. The composition as claimed in claim 1, containing 1 mol of the carbonyl-hydrogenated ketone-aldehyde resin and 1 to 10 mol of said (meth)acrylic acid and/or a derivative thereof containing a functional group reactive with the base resin.

27. The composition as claimed in claim 1, containing 1 mol of the carbonyl-hydrogenated ketone-aldehyde resin and 2 to 8 mol of said (meth)acrylic acid and/or a derivative thereof containing a functional group reactive with the base resin.

28. A radiation-curable resin, comprising the reaction product of (a) at least one resin selected from the group consisting of a carbonyl-hydrogenated ketone-aldehyde resin and a ring-hydrogenated phenol-aldehyde resin and (b) (meth)acrylic acid and/or a derivative thereof containing a functional group reactive with the base resin.

29. The radiation-curable resin as claimed in claim 28, obtained by reacting (a) at least one base resin selected from the group consisting of a carbonyl-hydrogenated ketone-aldehyde resin and a ring-hydrogenated phenol-aldehyde resin, (b) (meth)acrylic acid and/or a derivative thereof containing a functional group reactive with the base resin and (c) at least one additional hydroxyl-functionalized polymer.

30. The radiation-curable resin as claimed in claim 29, wherein the additional hydroxy-functionalized polymer is at least one of a polyether, polyester or polyacrylate.

31. The radiation-curable resin composition as claimed in claim 28, wherein the ketone in the carbonyl-hydrogenated ketone-aldehyde resin is at least one reacted C—H acidic ketone.

32. The radiation-curable resin as claimed in claim 28, wherein the ketone in the carbonyl-hydrogenated ketone-aldehyde resin is at least one ketone selected from the group consisting of acetone, acetophenone, methyl ethyl ketone, heptan-2-one, pentan-3-one, methyl isobutyl ketone, cyclopentanone, cyclododecanone, a mixture of 2,2,4- and 2,4,4-trimethylcyclopentanone, cycloheptanone, cyclooctanone, and cyclohexanone.

33. The radiation-curable resin as claimed in claim 28, wherein the ketone in the carbonyl-hydrogenated ketone-aldehyde resin is at least one reacted alkyl-substituted cyclohexanone having one or more alkyl radicals containing in total 1 to 8 carbon atoms.

34. The radiation-curable resin as claimed in claim 28, wherein the ketone in the carbonyl-hydrogenated ketone-aldehyde resin is at least one ketone selected from the group consisting of 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone.

35. The radiation-curable resin as claimed in claim 28, wherein the ketone in the carbonyl-hydrogenated ketone-aldehyde resin is at least one ketone selected from the group consisting of cyclohexanone, 4-tert-butylcyclohexanone, 3,3,5-trimethylcyclohexanone, and heptanone.

36. The radiation-curable resin as claimed in claim 28, wherein the aldehyde in the base resin is at least one reacted unit selected from the group consisting of formaldehyde, acetaldehyde, n-butyraldehyde, isobutyraldehyde, valeraldehyde, and dodecanal.

37. The radiation-curable resin as claimed in claim 36, wherein the aldehyde in the base resin is at least one aldehyde selected from the group consisting of formaldehyde, paraformaldehyde and trioxane.

38. The radiation-curable resin as claimed in claim 28, comprising at least one hydrogenation product of a reacted resin comprising reacted units of formaldehyde and at least one ketone selected from the group consisting of acetophenone, cyclohexanone, 4-tert-butylcyclohexanone, 3,3,5-trimethylcyclohexanone, and heptanone.

39. The radiation-curable resin as claimed in claim 28, comprising a reacted unit of hydrogenated phenol-aldehyde resin comprising at least one of formaldehyde, butyraldehyde or benzaldehyde.

40. The radiation-curable resin as claimed in claim 28, further comprising a minor amount of one or more reacted units of at least one nonhydrogenated phenol-aldehyde resin.

41. The radiation-curable resin as claimed in claim 28, wherein the ring-hydrogenated phenol-aldehyde resin is one or more reacted units of a ring-hydrogenated resin comprising one or more alkyl-substituted phenols.

42. The radiation-curable resin as claimed in claim 41, wherein the alkyl-substituted phenol is at least one member selected from the group consisting of 4-tert-butylphenol, 4-amyiphenol, nonylphenol, tert-octylphenol, dodecylphenol, cresol, xylenol, and bisphenol.

43. The radiation-curable resin as claimed in claim 28, wherein said (meth)acrylic acid derivative is at least one of (meth)acryloyl chloride, glycidyl (meth)acrylate, (meth)acrylic acid, a low molecular mass alkyl ester of (meth) acrylic acid or an anhydride of (meth)acrylic acid.

44. The radiation-curable resin as claimed in claim 28, wherein said (meth)acrylic acid derivative is a reaction product of (a) a hydroxyalkyl (meth)acrylate wherein the alkyl group contains 1 to 12 carbon atoms with (b) one or more diisocyanates.

45. The radiation-curable resin as claimed in claim 44, wherein the alkyl group contains from 2 to 8 carbon atoms.

46. The radiation-curable resin as claimed in claim 44, wherein the alkyl group contains from 2 to 6 carbon atoms.

47. The radiation-curable resin as claimed in claim 44, wherein said (meth)acrylic acid derivative is at least one of methacrylethyl isocyanate or methacrylbutyl isocyanate.

48. The radiation-curable resin as claimed in claim 41, wherein the diisocyanates are selected from the group consisting of cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate, bis(isocyanatophenyl)methane, propane diisocyanate, butane diisocyanate, pentane diisocyanate, hexamethylene diisocyanate (HDI), 1,5-diisocyanato-2-methylpentane (MPDI), heptane diisocyanate, octane diisocyanate, 1,6-diisocyanato-2,4,4-trimethylhexane, 1,6-diisocyanato-2,2,4-trimethylhexane (TMDI), 4-isocyanatomethyloctane 1,8-diisocyanate (TIN), decane di-isocyanate, decane triisocyanate, undecane diisocyanate, undecane triisocyanate, dodecane diisocyanate, dodecane triisocyanate, isophorone diisocyanate, bis (isocyanatomethylcyclohexyl)methane, isocyanatomethyl-methylcyclohexyl isocyanate, 2,5 (2,6)-bis (isocyanatomethyl) bicycle[2.2.1 ]heptane, 1,3 -bis (isocyanatomethyl)cyclohexane, and 1,4-bis (isocyanatomethyl)cyclohexane.

49. The radiation-curable resin as claimed in claim 28, further comprising one or more copolymers of polyisocyanates prepared by at least one of trimerizing, allophanatizing, biuretizing or urethanizing one or more simple diisocyanates.

50. The radiation-curable resin as claimed in claim 28, wherein said (meth)acrylic acid derivative is a reaction product of a 1:1 molar ratio of hydroxyethyl acrylate or hydroxyethyl methacrylate with at least one of isophorone diisocyanate, $H_{12}$ bis(isocyanatomethyl)cyclohexane ($H_{12}$MDI) or hexamethylene diisocyanate (HDI).

51. The radiation-curable resin as claimed in claim 28, wherein 1 mol, based on $M_n$, of at least one of the carbonyl-hydrogenated ketone-aldehyde resin or the ring-hydrogenated phenol-aldehyde resin and from 0.5 to 15 mol of said (meth)acrylic acid and/or a derivative thereof are present.

52. The radiation-curable resin as claimed in claim 28, containing 1 mol of the carbonyl-hydrogenated ketone-aldehyde resin and 1 to 10 mol of said (meth)acrylic acid and/or a derivative thereof containing a functional group reactive with the base resin.

53. The radiation-curable resin as claimed in claim 28, containing 1 mol of the carbonyl-hydrogenated ketone-aldehyde resin and 2 to 8 mol of said (meth)acrylic acid and/or a derivative thereof containing a functional group reactive with the base resin.

54. A process for preparing a radiation-curable resin, comprising:
reacting (a) at least one base resin selected from the group consisting of a carbonyl-hydrogenated ketone-aldehyde resin and a ring-hydrogenated phenol-aldehyde resin with (b) (meth)acrylic acid and/or a derivative thereof containing a functional group reactive with the base resin.

55. The process as claimed in claim 54, wherein a catalyst is present during the reaction.

56. The process as claimed in claim 54, wherein the reaction is conducted in a melt or in a solvent.

57. The process as claimed in claim 54, wherein the (meth)acrylic acid and/or a derivative containing a functional group reactive with the base resin is added to a solution or melt of at least one of the ketone-aldehyde resin or the phenol-aldehyde resin.

58. The process as claimed in claim 54, wherein the (meth)acrylic acid and/or a derivative containing a functional group reactive with the base resin is added to a solution or melt of at least one of the ketone-aldehyde resin or the phenol-aldehyde resin and a hydroxy-functional polymer.

59. The process as claimed in claim 54, further comprising:
adding at least one of a di- or trifunctional isocyanate to a solution or melt of at least one of the ketone-aldehyde resin or the phenol-aldehyde resin and a hydroxy-functional polymer to form a hydroxy-functional pre-adduct and subsequently adding said (meth)acrylic acid and/or a derivative thereof containing a functional group reactive with the base resin.

60. The process as claimed in claim 54, wherein the reaction is conducted at a temperature between 30 and 1500° C.

61. The process as claimed in claim 60, wherein the reaction is carried out at a temperature of between 50 and 140° C.

62. A process for preparing a radiation-curable resin, comprising:
reacting (a) at least one base resin selected from the group consisting of a carbonyl-hydrogenated ketone-aldehyde resin and a ring-hydrogenated phenol-aldehyde resin with (b) (meth)acrylic acid and/or a derivative thereof containing a functional group reactive with the base resin and (c) at least one additional hydroxy-functionalized polymer.

63. The process as claimed in claim 62, wherein a catalyst is present during the reaction.

64. The process as claimed in claim 62, wherein the reaction is conducted in a melt or in a solvent.

65. The process as claimed in claim 62, wherein said (meth)acrylic acid and/or a derivative thereof containing a functional group reactive with the base resin is added to a solution or melt of the ketone-aldehyde resin or the phenol-aldehyde resin.

66. The process as claimed in claim 62, wherein said (meth)acrylic acid and/or a derivative thereof containing a functional group reactive with the base resin is added to a solution or melt of at least one of the ketone-aldehyde resin or the phenol-aldehyde resin, and a hydroxy-functional polymer.

67. The process as claimed in claim 62, further comprising
adding at least one of a di- or trifunctional isocyanate to a solution or melt of at least one of the ketone-aldehyde resin or the phenol-aldehyde resin and a hydroxy-functional polymer to form a hydroxy-functional pre-adduct and subsequently
adding said (meth)acrylic acid and/or a derivative thereof containing a functional group reactive with the base resin.

68. The process as claimed in claim 62, wherein the reaction is conducted at a temperature between 30 and 150° C.

69. The process as claimed in claim 68, wherein the reaction is carried out at a temperature of between 50 and 140° C.

70. The process as claimed in claim 62, wherein the additional hydroxy-functionalized polymer is at least one of a polyether, polyester or polyacrylate.

* * * * *